United States Patent
Liu et al.

(10) Patent No.: US 9,629,059 B2
(45) Date of Patent: Apr. 18, 2017

(54) MOBILE NODE REGISTRATION METHOD, INTERCOMMUNICATION METHOD, SWITCHING METHOD AND NETWORK ELEMENT

(71) Applicant: ZTE CORPORATION, Shenzhen, Guangdong Province (CN)

(72) Inventors: Juan Liu, Shenzhen (CN); Wen Luo, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 186 days.

(21) Appl. No.: 14/404,464

(22) PCT Filed: May 10, 2013

(86) PCT No.: PCT/CN2013/075464
§ 371 (c)(1),
(2) Date: Nov. 27, 2014

(87) PCT Pub. No.: WO2013/178013
PCT Pub. Date: Dec. 5, 2013

(65) Prior Publication Data
US 2015/0110070 A1    Apr. 23, 2015

(30) Foreign Application Priority Data

May 29, 2012 (CN) .......................... 2012 1 0171410

(51) Int. Cl.
*H04W 40/02* (2009.01)
*H04W 60/00* (2009.01)
(Continued)

(52) U.S. Cl.
CPC ....... *H04W 40/02* (2013.01); *H04W 36/0055* (2013.01); *H04W 60/00* (2013.01); *H04W 80/045* (2013.01); *H04W 80/04* (2013.01)

(58) Field of Classification Search
CPC ..... H04W 40/00; H04W 40/02; H04W 40/36; H04W 36/0055; H04W 60/00
See application file for complete search history.

(56) References Cited

U.S. PATENT DOCUMENTS

2009/0052398 A1* 2/2009 Hofmann .......... H04W 36/0033
                                                                370/331
2010/0315992 A1   12/2010 Turanyi
(Continued)

FOREIGN PATENT DOCUMENTS

CN    101175316 A    5/2008
CN    101772193 A    7/2010
(Continued)

OTHER PUBLICATIONS

Liu et al., PMIP Based DMM Approaches, Mar. 13, 2012, Network Working Group, Internet-Draft, draft-liu-dmm-pmip-based-approach-02.*
(Continued)

*Primary Examiner* — Chi H Pham
*Assistant Examiner* — Shailendra Kumar
(74) *Attorney, Agent, or Firm* — Ling Wu; Stephen Yang; Ling and Yang Intellectual Property

(57) ABSTRACT

A registration method, intercommunication method, handover method for a mobile node and a network element are provided. The intercommunication method for a mobile node includes: after an enhanced mobile access gateway receives a data packet transmitted by the mobile node to a peer node for the first time, if the enhanced mobile access gateway provides an ePMIP service to the mobile node, the enhanced mobile access gateway judging whether a peer mobile access gateway to which the peer mobile node is currently attached provides an ePMIP service to the peer mobile node, and if so, forwarding the data packet in an ePMIP manner, and creating a local forwarding entry to
(Continued)

instruct a subsequent packet to be forwarded in the ePMIP manner, and if not, forwarding the data packet in a PMIP manner, and creating a local forwarding entry to instruct a subsequent packet to be forwarded in the PMIP manner.

17 Claims, 6 Drawing Sheets

(51) Int. Cl.
*H04W 80/04* (2009.01)
*H04W 36/00* (2009.01)

(56) References Cited

U.S. PATENT DOCUMENTS

| | | | | |
|---|---|---|---|---|
| 2010/0332627 | A1* | 12/2010 | Wang | H04W 8/06 709/220 |
| 2011/0128913 | A1* | 6/2011 | Chowdhury | H04L 63/0892 370/328 |
| 2011/0255473 | A1* | 10/2011 | Wu | H04W 8/082 370/328 |
| 2014/0153489 | A1* | 6/2014 | Perras | H04W 60/00 370/328 |

FOREIGN PATENT DOCUMENTS

| | | |
|---|---|---|
| CN | 101754168 A | 6/2011 |
| EP | 2375796 A1 | 10/2011 |

OTHER PUBLICATIONS

Gundavelli et al., Proxy Mobile IPv6, Aug. 2008, Network Working Group S. Gundavelli, Ed., Request for Comments: 5213.*

PMIP Based DMM Approaches draft-luo-dmm-pmip-based-dmm-approach-01.Network Working Group; Mar. 9, 2012; W. Luo et al. XP015081658.

Route Optimum Mechanisms for Local Communication on PMIPv6. 2010 2nd International Asia Conference on Informatics in Control Automation and Robotics; Wang Lingjiao et al. XP031663928.

An Extension to proxy Mobile IPv6 for Local Routing Optimization ; Network Working Group; Feb. 12, 2010; Q. Wu et al.; XP015066648.

PMIP Based DMM Approaches; Network Working Group; Mar. 13, 2012; D. Liu ; XP015082038.

* cited by examiner

MOBILE NODE REGISTRATION METHOD, INTERCOMMUNICATION METHOD, SWITCHING METHOD AND NETWORK ELEMENT

TECHNICAL FIELD

The present document relates to the field of mobile communications, and in particular, to a registration method, intercommunication method and handover method for a mobile node and a network element.

BACKGROUND OF THE RELATED ART

The Transmission Control Protocol/Internet Protocol (TCP/IP) does not consider the case that a topological location of a terminal will change in the initial design, i.e., the TCP/IP protocol itself does not support mobility. In a conventional TCP/IP network environment, the IP provides a routing function to the Internet. It allocates logical addresses i.e., IP addresses, to all nodes (including hosts and routers), and an IP address is allocated to each of the ports of each host. An IP address includes a network prefix portion and a host portion, and IP addresses of all hosts on the same link usually have the same network prefix portion and different host portions. This makes the IP be able to perform route selection based on a network prefix portion of an IP address of a destination node, thereby allowing the router to save a simple network prefix route in order, rather than save a separate route for each host. In this case, due to the use of a network prefix route, when the node is handed over from one link to another link without changing its IP address, the node is impossible to receive a data packet on the new link, thus not being able to communicate with other nodes.

With the dramatic increase in user demand for mobility and information, more and more people want to access to the Internet at a high-speed in the motion process, acquire on-demand information, and complete what they want to do. Therefore, the mobile Internet has become the future development direction of the Internet, but the defect that the conventional TCP/IP protocol does not support the mobility makes mobility management of the mobile node become a major problem faced by the mobile Internet.

In order to solve the problem of mobility management, popular mobility management technologies in the industry, such as Mobile IP (MIP), Proxy Mobile (PMIP) etc., support mobility of a terminal by means of introducing a fixed anchor. For example, the MIP protocol uses a Home agent (HA) as an anchor, and the PMIP protocol uses a Local Mobility Anchor (LMA) as an anchor.

FIG. 1 illustrates logical architecture of the PMIP protocol, including Mobile Nodes (MNs), i.e., MN1 and MN2, corresponding Mobile Access Gateways (MAGs), i.e., MAG1 and MAG2, and an LMA. The MAG is a first hop router MN, and its primary function includes allocating a Care of address (CoA) to the MN when the MN accesses and substituting the MN to perform PMIP binding with an anchor LMA of the MN. The LMA is used as an anchor of the MN, and its primary function includes allocating a Home of Address (HoA) to the MN and processing the above PMIP binding. The main purpose of performing PMIP binding between the MAG and the LMA is to make both parties to know addresses of each other, i.e., the above CoA and HoA, and store the addresses locally. In addition, in the process of performing PMIP binding, a bidirectional tunnel is established by the MN between the MAG and the LMA. It should be noted that, an IP address finally acquired by the MN is the HoA allocated by the LMA to the MN. In a typical network deployment, the MAG is generally located in the lower location of the topology, such as an edge of the metropolitan area; and the LMA is generally located in a higher location of the topology, such as a core part of the province network. In practice, the MAG and the LMA are often connected via a multi-hop router.

The mobility management of the PMIP protocol is embodied in that as the MN moves, the currently connected MAG can be changed, while maintaining the IP address of the MN (i.e. HoA) unchanged, that is the MN is always anchored in the local mobility anchor LMA which is initially registered. When the MN is handed over to a new mobile access gateway MAG, instead of the MN, the MAG registers a new PMIP binding with the anchor LMA and updates the new PMIP binding, and establishes a bidirectional tunnel between the anchor LMA and the new MAG to forward uplink and downlink data of the MN.

As shown in FIG. 1, a packet forwarding path between the MN1 and the MN2 is MN1<->MAG1<->LMA<->MAG2<->MN2. Packets transmitted by the MN1 to the MN2 arrive firstly at the MAG1, the MAG1 performs tunnel encapsulation on the packets and transmits the packets to the LMA through a tunnel between the MAG1 and the LMA, the LMA decapsulates the packets, re-encapsulates the packets, and transmits the packets to the MAG2 through a tunnel between the LMA and the MAG2, and the MAG2 decapsulates the packets and then forwards the packets to the MN2. The packets transmitted by the MN2 to the MN1 are forwarded in the same way. With the above method, the data between MN1 and MN2 always needs to be forwarded by a fixed anchor LMA, the data transmission path is not an optimal path, and decapsulation and re-encapsulation processes need to be performed by the LMA on the packets in the transmission process, which causes large delay and packet loss in the data transmission. A waste of transmission path may result in the following problems: in one aspect, the transmission bearing resources of carriers are wasted, resulting in an increase in operating costs; in another aspect, a delay in transmission and reception of IP packets between the MN1 and the MN2 is increased, which is not beneficial for improving the user's service experience; and in a further aspect, a large number of IP packets converge at the anchor LMA (usually an LMA can serve a number of MNs), which makes the LMA easily become a bottleneck of the performance, increases a possibility of congestion of the packets at the node, results in a decrease in the overall network quality, and results in the services of the MN being blocked or even impossible to implement (for example, real-time services such as voice, video etc.).

It should also be noted that when the MN1 and the MN2 are anchored on different local mobility anchors LMAs, reception and transmission of packets between the MN1 and the MN2 must be performed respectively via the anchors LMAs of the MN1 and the MN2. The roundabout waste of the packet transmission path is more obvious, and the above-described negative effects caused later are more severe.

In order to solve the waste problem of the transmission path existing in the PMIP mechanism and thus a series of resultant adverse consequences, there is a need to enhance the PMIP mechanism. FIG. 2 is enhanced PMIP protocol architecture.

Compared with the logical architecture of the PMIP protocol, network elements included in the ePMIP protocol architecture are a mobile node MN, an enhanced MAG (eMAG) and an enhanced LMA (eLMA).

As shown in FIG. 2, the eMAG1 is a first hop router of the MN1, and in addition to allocating a care of address CoA1 to the MN1 and substituting the MN1 to perform PMIP binding with the eLMA in the existing PMIP architecture, its primary functions further need to have the following functions (a first-hop router eMAG2 of the MN2 also has the same functions):

querying from the eLMA to acquire an address of the eMAG2 to which the communication node MN2 is currently connected or a care of address CoA2 of the communication node MN2;

establishing a bidirectional tunnel between the eMAG1 of the MN1 and the eMAG2 of the MN2, and forwarding IP data packets between the MN1 and the MN2; and the eLMA retaining functions of processing registration, deregistration and update of the MN, a function of allocating the HNP, and functions of establishing and maintaining the BCE in the LMA functions. With respect to the LMA, the eLMA has the following enhanced functions:

the eLMA is not used as an anchor of data packets, and the IP packets between MN1 and MN2 needs not to pass through the eLMA.

The eLMA needs to respond to an address query request message from the eMAG.

FIG. 2 illustrates a path of reception and transmission of IP packets between the MN1 and the MN2 under the ePMIP architecture, i.e., MN1 and MN2<->eMAG1<->eMAG2<->MN2. The data packets directly pass through the tunnel between the eMAG1 and the eMAG2, without passing through the eLMA, thereby avoiding a series of problems due to roundabout of the transmission path.

To sum up, the ePMIP protocol well solves a series of problems existing in the conventional PMIP protocol, but upgrade to the existing conventional PMIP device will bring a great impact to the network, and increases a cost in network operations. Therefore, in the beginning of transition from the conventional PMIP to the enhanced ePMIP, in a operator network in which a PMIP is already deployed, it needs to deploy the ePMIP in an incremental manner without making any change to the conventional PMIP device. FIG. 3 illustrates a diagram of architecture of deployment of the ePMIP in a conventional PMIP domain in an incremental manner. For convenience of description, a PMIPv6 domain is divided into area1 and area2, in which ePMIP and PMIP are deployed. The MN11 and MN12 in the area 1 communicate in an ePMIP manner, with reference to the flow in FIG. 2, and all mobile nodes (MN21, MN22 and MN23) in the area2 communicate in a PMIP manner, with reference to the flow in FIG. 1.

As shown in FIG. 3, a conventional mobile access gateway MAG13 is deployed in the area1, and an MN13 registers with the eLMA through the MAG13. In this scenario, the MN13 and other mobile nodes (e.g., the MN11 and the MN12 illustrated in FIG. 3) which are attached under the eMAG can not communicate. By taking communication between the MN13 and the MN11 as an example, after downlink data transmitted from the MN13 to the MN11 arrives at the MAG13, the MAG13 forwards the downlink data using a conventional PMIP. However, after the uplink data transmitted by the MN11 to the MN13 arrives at the eMAG11, the eMAG11 queries a location from the eLMA, to acquire location information of the mobile access gateway MAG13 of the MN13. But as a tunnel cannot be established between the MAG13 and the eMAG11, the uplink data cannot be forwarded to the MN13.

In a handover scenario, in the process of communication between the MN11 and the MN12, the MN11 is handed over from the enhanced mobile access gateway eMAG11 located in the area1 to the mobile access gateway MAG21 located in the area2. As when the mobile node is handed over in the PMIP, the anchor does not change, a new mobile access gateway MAG21 must registers new location information of the MN11 with an enhanced local mobility anchor eLMA located in the area1. During handover, the downlink data transmitted from the MN12 to the MN11 will also be transmitted to eMAG11 through a tunnel between the eMAG12 and the eMAG11. However, as a tunnel can not be established between the eMAG11 and the MAG21, the eMAG11 cannot forward the downlink data to the MAG21, and then to the MN11, thereby leading to a handover packet loss in such handover scenario.

The problem of packet loss in the above two scenarios is to be solved.

SUMMARY

The embodiments of the present invention provide a registration method, intercommunication method and handover method for a mobile node, a mobile access gateway and an eLMA, which are intended to ensure continuity of a session in the motion process of a terminal and intercommunication between terminals after the handover is completed in a scenario of deployment of the ePMIPv6 in an incremental manner in the PMIPv6 domain.

The embodiments of the present invention provide an intercommunication method for mobile nodes, comprising:

after an enhanced mobile access gateway receives a data packet transmitted by the mobile node to a peer node for the first time, if the enhanced mobile access gateway provides an enhanced Proxy Mobile IP (ePMIP) service to the mobile node, the enhanced mobile access gateway judging whether a peer mobile access gateway to which the peer mobile node is currently attached provides an ePMIP service to the peer mobile node, and if yes, forwarding the data packet in an ePMIP manner, and creating a local forwarding entry to instruct a subsequent packet to be forwarded in the ePMIP manner, and if not, forwarding the data packet in a Proxy Mobile IP (PMIP) manner, and creating a local forwarding entry to instruct a subsequent packet to be forwarded in the PMIP manner.

The above method is characterized in that the enhanced mobile access gateway judges whether the peer mobile access gateway provides an ePMIP service to the peer mobile node in the following manner:

the enhanced mobile access gateway transmitting a location query request to an enhanced Local Mobility Anchor (eLMA), and making a judgment according to flag information carried in a location query response returned by the eLMA, the flag information indicating whether the peer mobile access gateway provides the ePMIP service to the peer mobile node.

The above method is characterized in that the method further comprises:

after the eLMA receives a registration request from a mobile access gateway to register a mobile node which is attached to the mobile access gateway, wherein the registration request carries an indication of whether the mobile access gateway is able to provide an ePMIP service to a currently registered mobile node, determining whether to provide an ePMIP service to the currently registered mobile node, and establishing location information of the currently registered mobile node which includes flag information of whether the mobile access gateway provides an ePMIP service to the currently registered mobile node.

The above method is characterized in that the method further comprises: after the eLMA establishes the location information for the currently registered mobile node, transmitting negotiation information of whether the mobile access gateway provides an ePMIP service to the currently registered mobile node to the mobile access gateway.

The embodiments of the present invention provide a handover method for a mobile node, comprising:

in the process of communication between the mobile node and a peer mobile node, after the mobile node is handed over from a source mobile access gateway to a target mobile access gateway, the target mobile access gateway performing location update to an enhanced Local Mobility Anchor (eLMA) for the mobile node;

the eLMA transmitting, through the source mobile access gateway or directly, the location information of the mobile node to a peer mobile access gateway to which the peer mobile node is currently attached; and the peer mobile access gateway updating a local forwarding entry of the mobile node according to the location information, wherein if the target mobile access gateway provides an ePMIP service to the mobile node, updating the local forwarding entry to indicate forwarding a data packet transmitted by the peer mobile node to the mobile node in an enhanced Proxy Mobile IP (ePMIP) manner, and if the target mobile access gateway provides a PMIP service to the mobile node, updating the local forwarding entry to indicate forwarding the data packet in a Proxy Mobile IP (PMIP) manner.

The above method is characterized in that when the target mobile access gateway performs location update to the eLMA for the mobile node, carrying indication information of whether the target mobile access gateway is able to provide an ePMIP service to the mobile node; and after the eLMA receives the location update, determining whether the target mobile access gateway provides an ePMIP service to the mobile node, and updating location information of the mobile node which includes flag information of whether the target mobile access gateway provides an ePMIP service to the mobile node.

The above method is characterized in that the method further comprises:

when the peer mobile access gateway provides an ePMIP service to the peer mobile node, the source mobile access gateway provides an ePMIP service to the mobile node, and the target mobile access gateway is a non-enhanced mobile access gateway, after the source mobile access gateway receives a data packet transmitted by the peer mobile node to the mobile node which is forwarded by the peer mobile access gateway, transmitting the data packet to the eLMA; and the eLMA transmitting the data packet to the target mobile access gateway, and the target mobile access gateway transmitting the data packet to the mobile node.

The above method is characterized in that the eLMA directly transmitting the location information of the mobile node to the peer mobile access gateway comprises:

the eLMA transmitting a location update message carrying the location information of the mobile node to all mobile access gateways in its management domain.

The above method is characterized in that the eLMA directly transmitting the location information of the mobile node to the peer mobile access gateway comprises:

after the eLMA receives the data packet transmitted by the peer mobile node to the mobile node which is forwarded by the source mobile access gateway, searching for locally stored location information according to a source address of the data packet, and if a care-of address stored in the location information is different from a source address in an outer tunnel head of the data packet, the eLMA transmitting a location update message carrying the location information of the mobile node to the peer mobile access gateway.

The embodiments of the present invention provide a mobile access gateway, comprising a data forwarding unit, configured to: after receiving a data packet transmitted by the mobile node to a peer mobile node for the first time, if the mobile access gateway provides an enhanced Proxy Mobile IP (ePMIP) service to the mobile node, judge whether a peer mobile access gateway to which the peer mobile node is currently attached provides an ePMIP service to the peer mobile node, and if yes, forward the data packet in an ePMIP manner, and create a local forwarding entry to instruct a subsequent packet to be forwarded in the ePMIP manner, and if not, forward the data packet in a Proxy Mobile IP (PMIP) manner, and create a local forwarding entry to instruct a subsequent packet to be forwarded in the PMIP manner.

The above mobile access gateway is characterized in that the data forwarding unit is configured to judge whether the peer mobile access gateway provides an ePMIP service to the peer mobile node in the following way:

transmitting a location query request to an enhanced Local Mobility Anchor (eLMA), and making a judgment according to flag information carried in a location query response returned by the eLMA, the flag information indicating whether the peer mobile access gateway provides the ePMIP service to the peer mobile node.

The above mobile access gateway is characterized in that the mobile access gateway further comprises a registration unit, configured to:

transmit a registration request to the eLMA for the mobile node, which carries an indication of whether the mobile access gateway is able to provide an ePMIP service to the mobile node, and receive and store negotiation information of whether to provide an ePMIP service to the mobile node which is returned by the eLMA.

The above mobile access gateway is characterized in that the mobile access gateway further comprises a location updating unit, configured to: when the mobile access gateway is a target mobile access gateway to which the mobile node is handed over, perform location update for the mobile node to the eLMA, and carry indication information of whether the mobile access gateway is able to provide an ePMIP service to the mobile node.

The above mobile access gateway is characterized in that the data forwarding unit is further configured to: when the mobile node is handed over from the mobile access gateway to a target mobile access gateway which is a non-enhanced mobile access gateway in the process of communication between the mobile node and a peer mobile node in an ePMIP manner:

after receiving a data packet transmitted by the peer mobile node to the mobile node, transmit the data packet to the eLMA which transmits the data packet to the target mobile access gateway.

The embodiments of the present invention provide an enhanced Local Mobility Anchor (eLMA), comprising a registration unit, configured to: after receiving a registration request from a mobile access gateway for a mobile node, determine whether to provide an ePMIP service to the mobile node, and establish location information of the mobile node including flag information of whether a mobile access gateway to which the mobile node is attached provides an ePMIP service to the mobile node.

The above eLMA is characterized in that the eLMA further comprises a responding unit, configured to: after receiving a location query request from the mobile access gateway, return a location query response, the location query response carrying flag information of whether a mobile access gateway of a peer mobile node provides an ePMIP service to the peer mobile node which is queried by the mobile access gateway.

The above eLMA is characterized in that the registration unit is further configured to: after establishing the location information for the mobile node, transmit the negotiation information of whether the mobile access gateway to which the mobile node is attached provides an ePMIP service to the mobile node to the mobile access gateway.

The above eLMA is characterized in that the eLMA further comprises a location updating unit, configured to: in the process of communication between the mobile node and a peer mobile node, after the mobile node is handed over from the mobile access gateway to a target mobile access gateway and a location update is received from the target mobile access gateway, determine flag information of whether the target mobile access gateway provides an ePMIP service to the mobile node, update the location information of the mobile node, and transmit, through the mobile access gateway or directly, the location information of the mobile node to a peer mobile access gateway to which the peer mobile node is currently attached, which includes the flag information of whether the target mobile access gateway provides an ePMIP service to the mobile node.

The above eLMA is characterized in that the location updating unit is configured to directly transmit the location information of the mobile node to the peer mobile access gateway in the following way:

transmitting a location update message carrying the location information of the mobile node to all mobile access gateways in its management domain.

The above eLMA is characterized in that the location updating unit is configured to directly transmit the location information of the mobile node to the peer mobile access gateway in the following way:

after receiving the data packet transmitted by the peer mobile node to the mobile node which is forwarded by the mobile access gateway, searching for locally stored location information according to a source address of the data packet, and if a care-of address stored in the location information is different from a source address in an outer tunnel head of the data packet, transmitting a location update message carrying the location information of the mobile node to the peer mobile access gateway.

The embodiments of the present invention provide a registration method for a mobile node, comprising:

when an enhanced Mobile Access Gateway (eMAG) or a Mobile Access Gateway (MAG) registering to an enhanced Local Mobility Anchor (eLMA) for a mobile node, carrying an indication of whether the eMAG or MAG to which the mobile node is currently attached is able to provide an enhanced Proxy Mobile IP (ePMIP) service, to the mobile node; and after the eLMA receives a registration request from the eMAG or MAG, establishing location information for the mobile node which includes flag information for identifying whether the eLMA decides to provide an ePMIP service or a Proxy Mobile IP (PMIP) service to the mobile node.

The above method is characterized in that the method further comprises: after the eLMA establishes the location information for the mobile node, transmitting negotiation information of whether to provide an ePMIP service to the mobile node to the eMAG or MAG.

The embodiments of the present invention provide, based on an enhanced ePMIP protocol, an intercommunication and handover method between mobile nodes in a scenario of deployment of the ePMIP protocol in an incremental manner, which is intended to achieve intercommunication between a mobile node in an ePMIP area and a mobile node in a PMIP area, and smooth handover of a mobile node between the two areas, thereby meeting requirements on intercommunication and mobility between MNs after deployment in an incremental manner.

PREFERRED EMBODIMENTS OF THE PRESENT INVENTION

The technical schemes of the present document will be further described in detail below in conjunction with accompanying drawings and specific embodiments, to make those skilled in the art to better understand the present document and implement the present document. However, the examples are not used to define the present document. It should be illustrated that without conflict, the embodiments in the present application and the features in the embodiments could be combined with each other randomly.

How to distinguish an ePMIP forwarding manner and a conventional PMIP forwarding manner by the eMAG and correctly forward data based on a selected forwarding manner is a problem to be solved. When a mobile node is handed over from an eMAG to a MAG, downlink data will be forwarded, through a tunnel with the eMAG, to an eMAG to which the mobile node is attached before the handover. At this time, how to forward, by the eMAG, the data to a MAG to which the MN is newly attached is also a problem to be solved.

For convenience of description, one PMIPv6 management domain will be divided logically into two areas below. An ePMIP area represents an area managed by an enhanced local mobility anchor eLMA (with reference to area1 in FIG.

Figure 1:
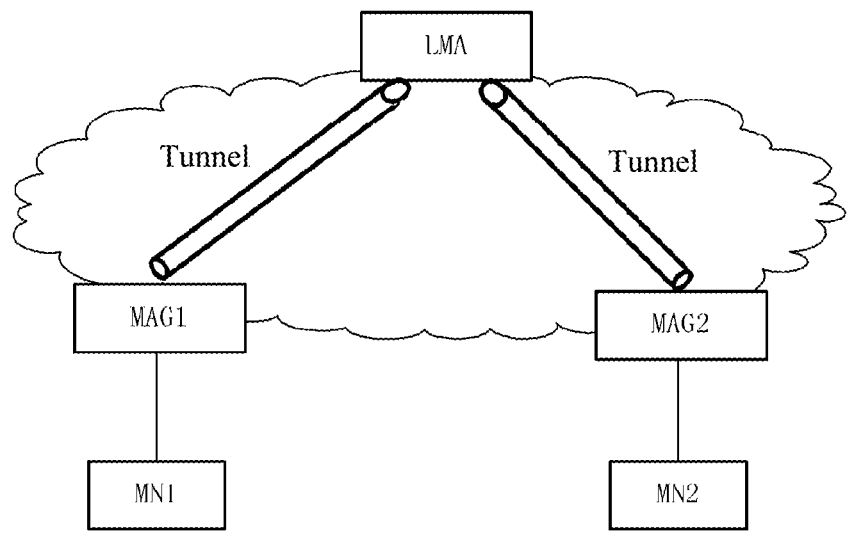
FIG. 1 is a diagram of a PMIPv6 packet forward path in the related art.
Figure 2:
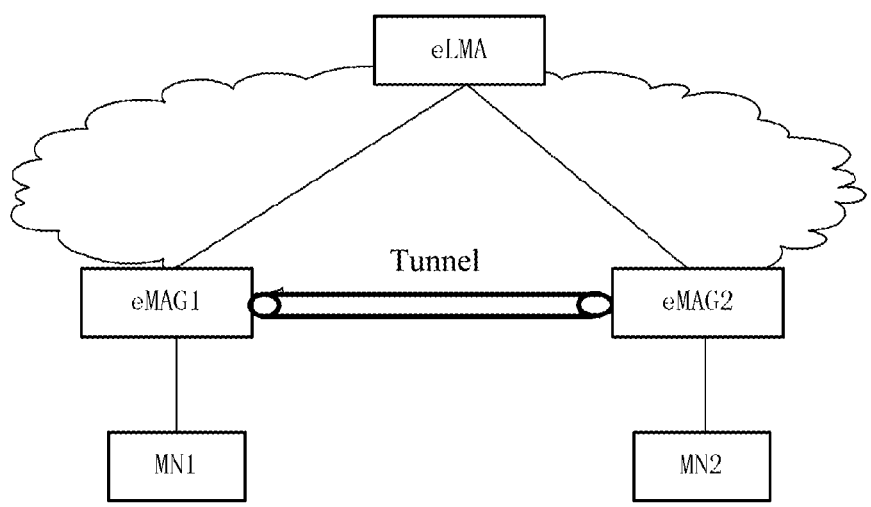
FIG. 2 is a diagram of an enhanced ePMIPv6 packet forward path.
Figure 3:
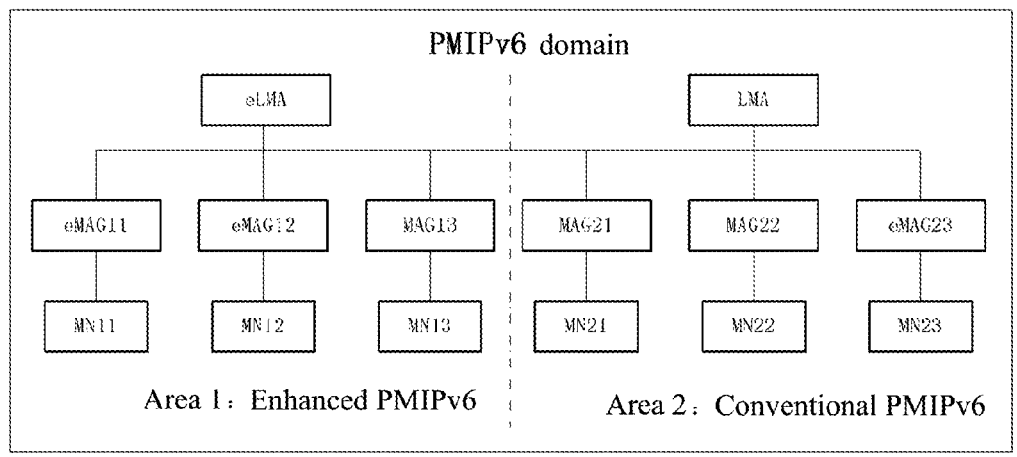
FIG. 3 is a block diagram of deployment of the ePMIPv6 in a PMIPv6 domain in an incremental manner.

3), and a PMIP area represents an area managed by a conventional local mobility anchor LMA (with reference to area2 in FIG. 3).

The embodiments of the present invention provide a registration method for a mobile node, comprising:

when an enhanced Mobile Access Gateway (eMAG) or a Mobile Access Gateway (MAG) registering with an enhanced Local Mobility Anchor (eLMA), carrying an indication of whether the eMAG or MAG to which the mobile node is attached can provide an enhanced Proxy Mobile IP (ePMIP) service, to the mobile node; and after the eLMA receives a registration request from the eMAG or MAG, establishing location information for the mobile node which includes flag information identifying whether the eLMA decides to provide an ePMIP service or a Proxy Mobile IP (PMIP) service to the mobile node.

Wherein, the method further comprises: after the eLMA establishes the location information for the mobile node, transmitting negotiation information of whether to provide an ePMIP service to the mobile node to the eMAG or MAG.

The embodiments of the present invention provide an intercommunication method for a mobile node, comprising:

after an enhanced mobile access gateway receives a data packet transmitted by the mobile node to a peer node for the first time, if the enhanced mobile access gateway provides an enhanced Proxy Mobile IP (ePMIP) service to the mobile node, the enhanced mobile access gateway judging whether a peer mobile access gateway to which the peer mobile node is currently attached provides an ePMIP service to the peer mobile node, and if so, forwarding the data packet in an ePMIP manner, and creating local forwarding entries to instruct a subsequent packet to be forwarded in the ePMIP manner, and if not, forwarding the data packet in a Proxy Mobile IP (PMIP) manner, and creating local forwarding entries to instruct a subsequent packet to be forwarded in the PMIP manner.

Wherein, the enhanced mobile access gateway judges whether a peer mobile access gateway provides an ePMIP service to the peer mobile node in the following manner:

the enhanced mobile access gateway transmitting a location query request to an enhanced Local Mobility Anchor (eLMA), and making a judgment according to flag information carried in a location query response returned by the eLMA, indicating whether the peer mobile access gateway provides the ePMIP service to the peer mobile node.

Wherein, the method further comprises:

after the eLMA receives a registration request from a mobile access gateway to register a mobile node which is attached to the mobile access gateway wherein the registration request carries an indication of whether the mobile access gateway can provide an ePMIP service to a currently registered mobile node, determining whether to provide an ePMIP service to the currently registered mobile node, and establishing location information of the currently registered mobile node which includes flag information of whether the mobile access gateway provides an ePMIP service to the currently registered mobile node.

Wherein, after the eLMA establishes the location information for the currently registered mobile node, negotiation information of whether the mobile access gateway provides an ePMIP service to the currently registered mobile node is transmitted to the mobile access gateway.

After receiving the data packet for the first time, the mobile access gateway judges whether to provide an ePMIP service to the mobile node according to the negotiation information; and the mobile access gateway is the enhanced mobile access gateway and/or the peer mobile access gateway.

The embodiments of the present invention provide a handover method for a mobile node, comprising:

in the process of communication between the mobile node and a peer mobile node, after the mobile node is handed over from a source mobile access gateway to a target mobile access gateway, the target mobile access gateway performing location update to an enhanced Local Mobility Anchor (eLMA) for the mobile node;

the eLMA transmitting, through the source mobile access gateway or directly, the location information of the mobile node to a peer mobile access gateway to which the peer mobile node is currently attached; and the peer mobile access gateway updating local forwarding entries of the mobile node according to the location information, wherein if the target mobile access gateway provides an ePMIP service to the mobile node, updating the local forwarding entries to indicate forwarding a data packet transmitted by the peer mobile node to the mobile node in an enhanced Proxy Mobile IP (ePMIP) manner, and if the target mobile access gateway provides a PMIP service to the mobile node, updating the local forwarding entries to indicate forwarding the data packet in a Proxy Mobile IP (PMIP) manner.

Wherein, when the target mobile access gateway performs location update to the eLMA for the mobile node, carrying indication information of whether the target mobile access gateway can provide an ePMIP service to the mobile node; and after the eLMA receives the location update, determining whether the target mobile access gateway provides an ePMIP service to the mobile node, and updating location information of the mobile node which includes flag information of whether the target mobile access gateway provides an ePMIP service to the mobile node.

When the peer mobile access gateway provides an ePMIP service to the peer mobile node, the source mobile access gateway provides an ePMIP service to the mobile node, and the target mobile access gateway is a non-enhanced mobile access gateway, after the source mobile access gateway receives a data packet transmitted by the peer mobile node to the mobile node which is forwarded by the peer mobile access gateway, the data packet is transmitted to the eLMA; and the eLMA transmits the data packet to the target mobile access gateway, and the target mobile access gateway transmits the data packet to the mobile node.

Wherein, the eLMA directly transmitting the location information of the mobile node to the peer mobile access gateway comprises:

the eLMA transmitting a location update message carrying the location information of the mobile node to all mobile access gateways in its management domain, or after the eLMA receives the data packet transmitted by the peer mobile node to the mobile node which is forwarded by the source mobile access gateway, locally stored location information is searched for according to a source address of the data packet, and if a care-of address stored in the location information is different from a source address in an outer tunnel head of the data packet, the eLMA transmits a location update message carrying the location information of the mobile node to the peer mobile access gateway.

Embodiment One

Figure 4:
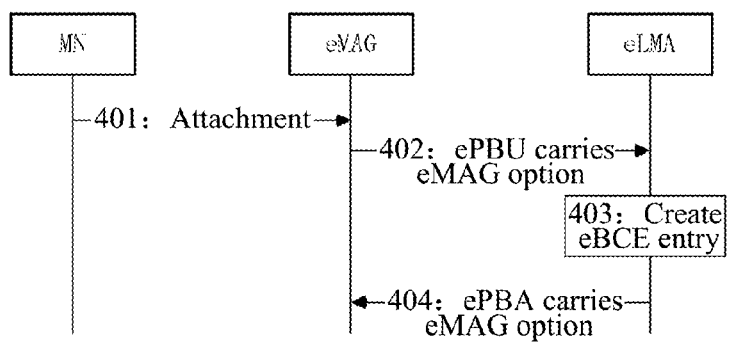
FIG. 4 is a flowchart of registration of a mobile node according to embodiment one of the present invention.

With reference to FIG. 4, illustrated is a flowchart of registration of a mobile node under the ePMIP protocol according to an embodiment of the present invention, which includes the following steps.

In step 401, an MN accesses to an ePMIP area through an attachment process, and transmits a Router Solicitation (RS) message (not shown) to an eMAG to which the MN belongs.

In step 402, the eMAG transmits an extended Proxy Binding Update (ePBU) message to the eLMA, to substitute the MN to register with the eLMA. In addition to information such as an MN identity (MN-ID) and a Care of Address (CoA) allocated by the eMAG to the NN, the message also needs to carry an eMAG option. A value of the eMAG option is set to 1, which represents that the eMAG can provide an ePMIP service to the MN.

In step 403, the eLMA receives the ePBU message, allocates a Home Network Prefix (HNP) to the MN, establishes position information for the MN, and establishes an extended Binding Cache Entry (eBCE). In addition to information such as the MN-ID, the HNP and the CoA etc., the eBCE also needs to newly add an enhanced (E) flag.

If the eLMA decides to provide an ePMIP service to the MN according to a policy or a configuration file, the E flag is set to 1, and at this time, the eLMA and the eMAG will provide an ePMIP service to the MN; and if a conventional PMIP service is provided to the MN, the E flag is set to 0.

It should be noted that on the eLMA, the E flag is set to 0 by default (which represents that a conventional PMIP service is provided to the MN). When the eLMA receives a PBU message transmitted by a conventional mobile access gateway MAG, the eLMA sets the E flag to 0 by default.

In step 404, the eLMA returns an extended Proxy Binding Ack (ePBA) message to the eMAG. In addition to information such as the HNP allocated by the eLMA to the MN, the message also needs to carry a new mobile option, i.e., an eMAG option. If the eLMA decides to provide an ePMIP service to MN according to a policy or a configuration file, the eMAG option is set to 1; and if a conventional PMIP service is provided, the eMAG option is set to 0. After the eMAG receives an ePBA message from the eLMA, if a value of the eMAG option is 1, an ePMIP service is provided to the MN; and if the value of the eMAG option is 0, a conventional PMIP service is provided to the MN.

Embodiment Two

Figure 5:
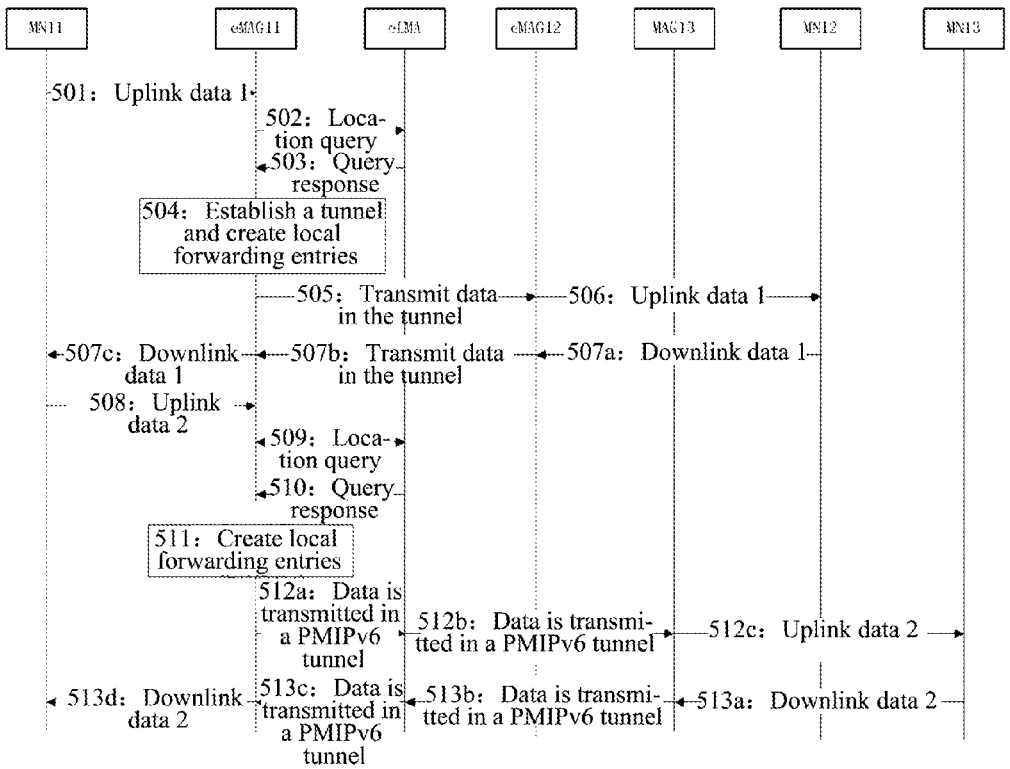
FIG. 5 is a flowchart of intercommunication of mobile nodes according to embodiment two of the present invention.

FIG. 5 is embodiment two of an intercommunication method for a mobile node according to the present document. As shown FIG. 3, the MN11 and the MN12 are respectively attached to the eMAG11 and the eMAG12, and the MN13 is attached to the MAG13. All of them have a common anchor eLMA, and register with the eLMA in accordance with the method in embodiment one. As shown in FIG. 5, the present embodiment includes the following steps.

In step 501, the MN11 transmits an uplink data packet 1 to the MN12, and the data packet is encapsulated with a home address of the MN12 as a destination address and with an HoA11 of the MN11 as a source address, and the data packet is transmitted firstly to an access gateway eMAG11 of the MN11. According to the method in embodiment one, if the eMAG11 can provide an ePMIP service to the MN, steps 502-506 will be performed; and if a conventional ePMIP is provided to the MN, the eMAG11 will directly forward the data packet 1 in a conventional PMIP manner.

In step 502, the MN11 firstly transmits the data packet to the MN12, and the eMAG11 queries a care of address CoA12 of the MN12 from the eLMA, i.e., an address of the eMAG12. The eMAG11 transmits a query message to the eLMA, the query message carrying a home address HoA12 of the MN12.

In step 503, the eLMA stores a binding cache entry eBCE of the MN12, including a binding relationship between the home address HoA12 and the care of address CoA12 of the MN12, and an E flag which is used to indicate whether a mobile access gateway to which the MN12 is currently attached provides an ePMIP service to the MN12. The eLMA returns a query response message to the eMAG11, which carries the care of address CoA12 of the MN12 and the E flag.

In step 504, if after the eMAG11 receives the query response message, it judges that the E flag is 1, a tunnel to the eMAG12 is established according to the care of address CoA12 of the MN12 (which may be an IP in IP tunnel, a GRE tunnel, a UDP tunnel, a GTP tunnel etc.), and local forwarding entries are established to instruct the mobile node to route the data packet 1 in an ePMIP manner, and perform steps 505-506. If the eMAG11 judges that the E flag is 0, the local forwarding entries are created to instruct the mobile node to route the data packet 1 in a conventional PMIP manner.

In step 505, after the eMAG11 performs tunnel encapsulation on the uplink data packet 1, the eMAG11 transmits the uplink data packet 1 to the eMAG12. A destination address of a head of the tunnel encapsulation is the care of address CoA12 of the MN12, and a source address thereof is the care of address CoA11.

In step 506, after the eMAG12 receives a tunnel encapsulated packet transmitted by the eMAG11, it decapsulates an outer tunnel head and then transmits the uplink data packet 1 to the MN12.

In step 507, the MN12 transmits a downlink data packet 1 to the MN11, which is the same as steps 501-506, and will not be repeated here.

In steps 508-510, the MN11 transmits an uplink data packet 1 to the MN13, which is similar to steps 501-503, with substituting MN12 with MN13.

In step 511, after the eMAG11 receives a query response message, it judges that the E flag is 0, and creates local forwarding entries to instruct the eMAG11 to forward the uplink data packet 2 in a conventional PMIP manner. The MN13 to which the MAG13 is attached is a conventional mobile access gateway, instead of the MN13, the MAG13 registers with the eLMA in a conventional PMIP manner. Therefore, the E flag stored in the eBCE cache entry corresponding to the MN13 is 0 by default.

In step 512, the eMAG11 forwards the uplink data packet 2 to the MN13 in a conventional PMIP manner.

In step 513, the MN13 transmits a downlink data packet 2 to the MN11, and the downlink data packet 2 is routed to the MN11 in a conventional PMIP manner.

Embodiment Three

Figure 6:
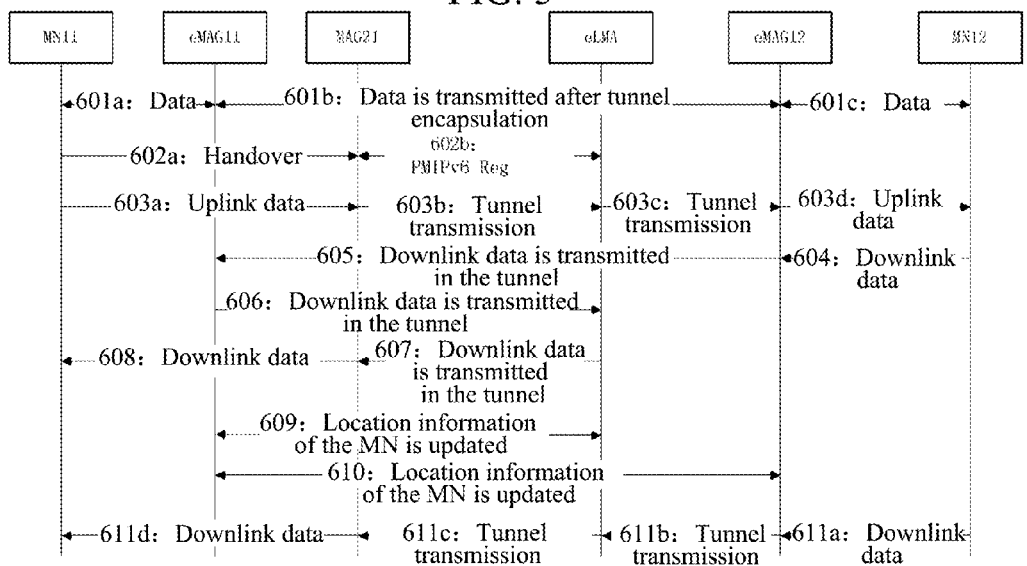
FIG. 6 is a flowchart of a handover method for a mobile node according to embodiment three of the present invention.

FIG. 6 is embodiment three of a handover method for a mobile node according to the present document. As shown in FIG. 3, the MN11 is handed over from the eMAG11 to the MAG21. As shown in FIG. 6, the present embodiment solves a communication processing method after the MN11 is handed over in the process of communication between the MN11 and the MN12, which includes the following steps.

In step 601, the MN11 and the MN12 communicate with each other in an ePMIP manner. The communication method can be known with reference to embodiment two, and will not be repeated here.

In step 602, the MN11 is handed over from the eMAG11 to a new mobile access gateway MAG21, the MAG21, instead of the MN11, transmits a binding update message to the eLMA to update the current location information of the MN11. As shown in step 602b, a conventional PBU/PBA message is used between the MAG21 and the eLMA, without carrying an eMAG option. Therefore, in addition to updating the location information of the MN11 stored in the eBCE entry, the eLMA also needs to set the E flag therein to 0.

In step 603, uplink data transmitted by the MN11 is routed to the MN12 in a conventional PMIP manner.

In step 604, the MN12 transmits downlink data to the MN11, and encapsulates the data packet with a home address HoA11 of the MN11 as a destination address and with the HoA12 of the MN12 as a source address, and the data packet is transmitted firstly to an access gateway eMAG12 of the MN12.

In step 605, the eMAG12 queries local forwarding entries according to the destination address HoA11 of the packet, finds a forwarding entry corresponding to the HoA11, and performs tunnel encapsulation on the packet in an ePMIP manner and then transmits the packet to the eMAG11 to which MN11 is attached to before handover.

In step 606, after the eMAG11 receives a tunnel encapsulated packet transmitted by the eMAG12, the eMAG11 decapsulates an outer tunnel head. As the MN11 has been handed over to a new mobile access gateway MAG21, the eMAG11 performs tunnel re-encapsulation on the packet and then transmit it to the eLMA. The tunnel is the PMIP tunnel already established between the eMAG11 and the eLMA.

In step 607, after the eLMA receives the tunnel encapsulated packet transmitted by the eMAG11, the eLMA decapsulates the outer tunnel head, performs re-encapsulation on the downlink packet, and then transmits it to a mobile access network MAG21 to which the MN is currently attached. The tunnel is the PMIP tunnel already established between the MAG21 and the eLMA.

In step 608, after the MAG21 decapsulates the packet, it transmits the downlink data to the MN11.

It should be noted that steps 606-608 are not required steps. For a packet loss sensitive service, methods of steps 606-608 are used to avoid packet loss. For a packet loss insensitive service, after the eMAG11 receives the tunnel encapsulated packet transmitted by the eMAG12, it decapsulates the outer tunnel head, finds that the MN11 has been handed over to a new mobile access gateway, and discards the data packet.

In step 609, the eLMA notifies the eMAG11 of the current location information of the MN11. The message carries a home address HoA11 of the MN11, current location information CoA21 (an address of the MAG21), and an E flag. If a value of the E flag is 0, it represents that the mobile access gateway MAG21 to which the MN11 is currently attached is a conventional mobile access gateway.

In step 610, the eMAG11 transmits the location information acquired in step 609 to the eMAG 12, including the home address HoA11 of the MN11, the current location information CoA21 (the address of the MAG21) and the E flag, and the eMAG12 updates a local forwarding entry corresponding to the HoA11. As the E flag is 0, the updated local forwarding entry indicates that the data packet will be transmitted to the MN11 in a conventional PMIP manner.

It should be noted that steps 609-610 may be performed at any time after the step 602, and an order of the steps 609-610 and the steps 603-608 is not critical.

In step 611, the MN12 transmits downlink data to the MN11, and when the data arrives at the eMAG12, the eMAG12 queries local forwarding entries, and transmits the downlink data to the MN11 in a conventional PMIP manner.

With the method described in the above embodiment three, it ensures that the data packet will not lost in the process of the mobile node being handed over from the ePMIP area to the PMIP area.

Embodiment Four

Figure 7:
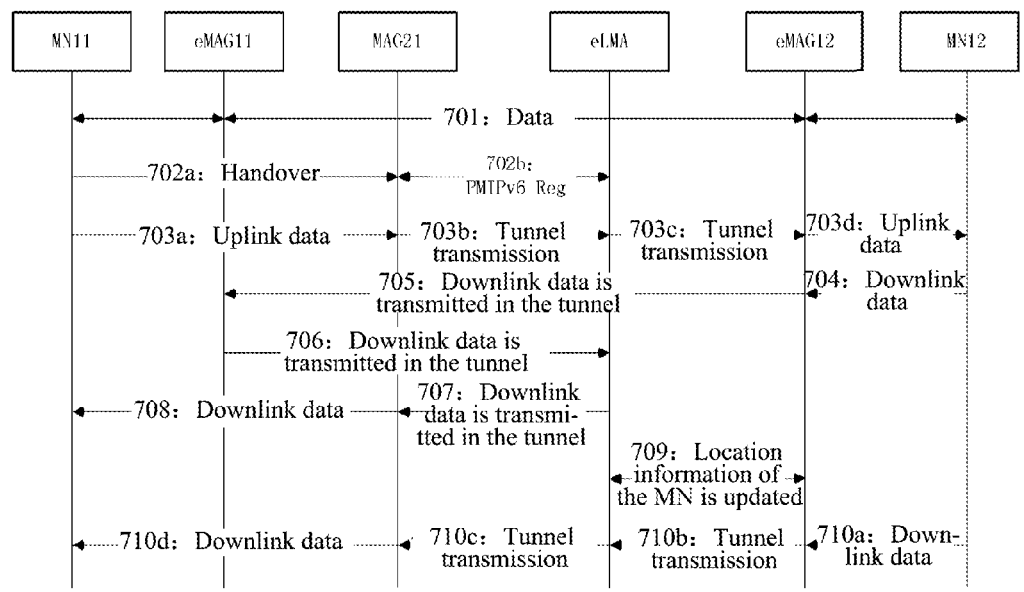
FIG. 7 is a flowchart of a handover method for a mobile node according to embodiment four of the present invention.

FIG. 7 is embodiment four of a handover method for a mobile node according to the present-document, which includes the following steps:

Step 701-708 are the same as steps 601-608, and will not be repeated here.

In step 709, the eLMA transmits the location update message to all eMAGs including the eMAG12 in the management domain, including the home address HoA11 of the MN11, the current location information CoA21 (the address of the MAG21) and the E flag, and after receiving the message, the eMAG12 updates a local forwarding entry corresponding to the HoA11. As the E flag is 0, the updated local forwarding entry indicates that the data packet will be transmitted to the MN11 in a conventional PMIP manner. The location update message may be transmitted by the eLMA at any time after the step 702, and an order of the step 702 and the steps 703-708 is not critical.

Alternatively, the eLMA may parse a packet on which tunnel encapsulation is performed from the eMAG11, and after receiving the downlink tunnel packet in step 706, the eLMA decapsulates the outer tunnel head, searches for a locally stored eBCE entry according to a source address (i.e., a home address HoA12 of the MN12) of the downlink packet, and the eLMA judges whether the tunnel encapsulated packet is from the mobile access gateway eMAG12 to which the MN12 is currently attached according to the eBCE of the MN12. If the care of address CoA12 stored in the eBCE entry is different from a source address of the tunnel head, it illustrates that the tunnel encapsulated packet is not directly from the mobile access gateway eMAG12 to which the MN12 is currently attached, and then the eLMA is triggered to transmit a location update message to the eMAG12, including the home address HoA11 of the MN11, the current location information CoA21 (the address of the MAG21) and the E flag, and after eMAG12 receives the message, it updates the local forwarding entry corresponding to the HoA11. As the E flag is 0, the updated local forwarding entry indicates that the data packet will be transmitted to the MN11 in a conventional PMIP manner.

Step 710 is the same step 611.

Embodiment Five

Figure 8A:
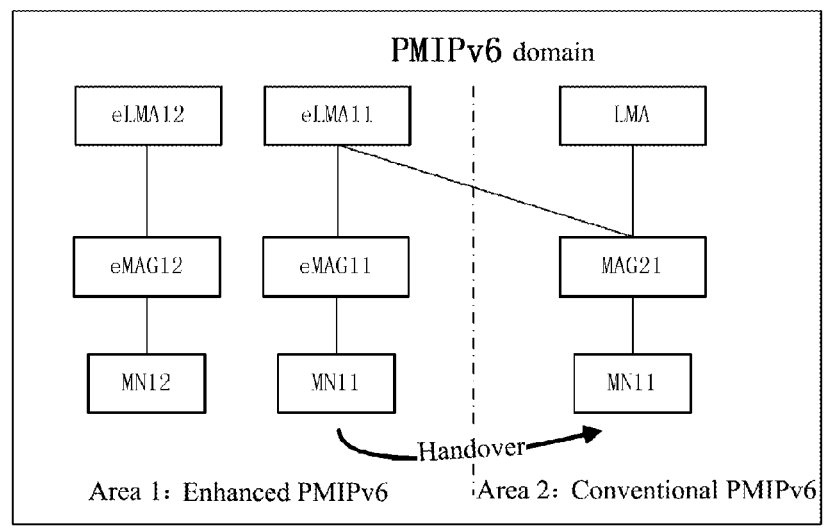
FIG. 8a is a diagram of handover of a mobile node.
Figure 8B:
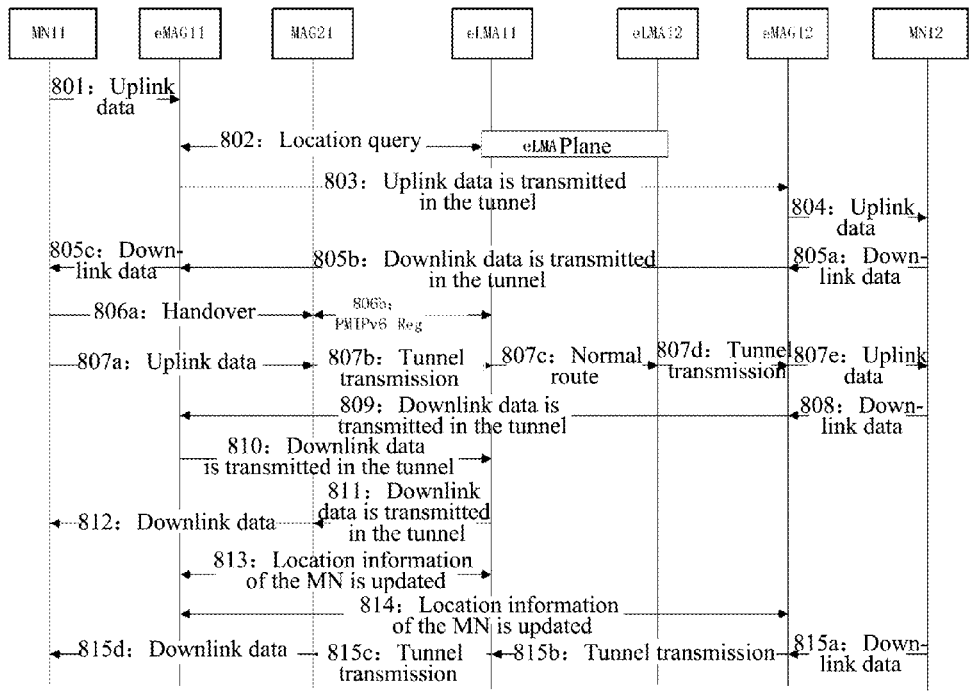
FIG. 8b is a flowchart of a handover method for a mobile node according to embodiment five of the present invention.

FIG. 8 is embodiment five of a handover method for a mobile node according to the present document. As shown in FIG. 8a, the MN11 is attached to the eMAG11 and is anchored on the eLMA11, and the MN12 is attached to the eMAG12 and is anchored on the eLMA12. The MN11 is handed over to the MAG21 in the process of communicating with the MN12. As shown in FIG. 8b, the present embodiment solves a communication processing method after the MN11 is handed over, which includes the following steps.

Step 801 is the same as step 501.

In step 802, the MN11 transmits a data packet to the MN12 for the first time, and the eMAG11 needs to query a location where the MN12 is currently located, i.e., an address of the eMAG12. However, as the location information of the MN11 and the MN12 is respectively managed by the eLMA11 and the eLMA12, the eLMA11 and the eLMA12 cannot query the address information of the eMAG12 from the eLMA11, and can query the address in the following several manners.

In a first manner, the eMAG11 transmits a location query message carrying a hop-by-hop option header to the MN12 according to the home address HoA12 of the MN12. The location query message indicates that the address of the eMAG12 and the E flag are to be acquired. A source address of the location query message is an address of the eMAG11, and a destination address thereof is a home address HoA12 of the MN12. The message will be intercepted by the eLMA12, and a locally stored eBCE entry is inquired according to the home address HoA12 of the MN12, to acquire the address of the eMAG12 and the E flag, a location query response message is transmitted to the eMAG11, and the eMAG11 acquires the address of the eMAG12 and the E flag through the response message returned by the eLMA12.

In a second manner, an operator configures statically different eLMAs to mange different prefix ranges, and all eMAGs know the eLMA to which the prefix belongs according to the prefix information. The eMAG11 knows that the HoA12 belongs to a prefix range managed by the eLMA12 according to the home address HoA12 of the MN12, and the eMAG11 directly queries the address of the eMAG12 and the E flag from the eLMA12.

In a third manner, an operator configures statically different eLMAs to mange different prefix ranges, and each eMAG in the same management domain knows prefix ranges managed by other eLMAs. The eMAG11 transmits a location query message to an adjacent eLMA (for example, eLMA11), after receiving the location query message, the eLMA11 knows that the HoA12 belongs to a prefix range managed by the eLMA12 according to the home address HoA12 of the MN12, then forwards the location query message to the eLMA12 through an interface between the eLMA11 and eLMA12, and finally acquires the address of the eMAG12 and the E flag.

Steps 803-805 are the same as steps 505-507, and will not be repeated here.

Step 806 is the same as step 602.

Step 807 is a flow of forwarding uplink data after the MN11 is handed over.

In steps 807a-807b, the uplink data is transmitted to the eLMA11 in a PMIPv6 manner.

In step 807c, the eLMA11 removes the tunnel encapsulation head, and routes the uplink data to the eLMA12 in a conventional routing manner.

In steps 807d-807e, the uplink data is transmitted to the MN12 in a PMIPv6 manner.

Steps 808-814 are the same as steps 604-610.

Step 815 is a flow of forwarding downlink data after the MN11 is handed over.

Figure 9:
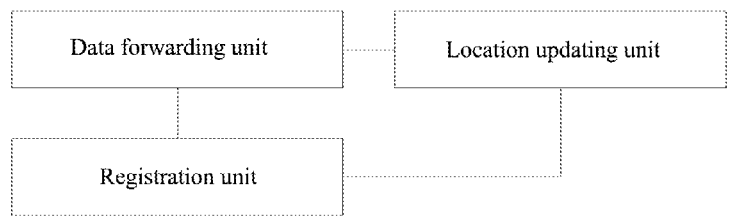
FIG. 9 is a block diagram of a mobile access gateway according to an embodiment of the present invention.

The embodiments of the present invention further provide a mobile access gateway, as shown in FIG. 9, comprising a data forwarding unit, configured to: after receiving a data packet transmitted by the mobile node to a peer node for the first time, if the enhanced mobile access gateway provides an enhanced Proxy Mobile IP (ePMIP) service to the mobile node, judge whether a peer mobile access gateway to which the peer mobile node is currently attached provides an ePMIP service to the peer mobile node, and if so, forward the data packet in an ePMIP manner, and create local forwarding entries to instruct a subsequent packet to be forwarded in the ePMIP manner, and if not, forward the data packet in a Proxy Mobile IP (PMIP) manner, and create local forwarding entries to instruct a subsequent packet to be forwarded in the PMIP manner.

Wherein, the data forwarding unit is configured to judge whether the peer mobile access gateway provides an ePMIP service to the peer mobile node in the following mode:

the data forwarding unit transmitting a location query request to an enhanced Local Mobility Anchor (eLMA), and making a judgment according to flag information carried in a location query response returned by the eLMA, indicating whether the peer mobile access gateway provides the ePMIP service to the peer mobile node.

Wherein, the mobile access gateway further comprises a registration unit, configured to:

transmit a registration request to the eLMA for the mobile node, which carries an indication of whether the mobile access gateway can provide an ePMIP service to the mobile node, and receive and store negotiation information of whether to provide an ePMIP service to the mobile node which is returned by the eLMA.

Wherein, the data forwarding unit is further configured to: after the peer mobile node is handed over from a source mobile access gateway to a target mobile access gateway in the process of communicating with the mobile node, after the data forwarding unit receives location information of the peer mobile node which is forwarded by the eLMA, updating the local forwarding entry of the mobile node according to the location information, wherein, if the mobile access gateway to which the peer mobile node is currently attached provides an ePMIP service to the peer mobile node, updating the local forwarding entries to instruct forwarding the data packet transmitted by the mobile node to the peer mobile node in an ePMIP manner, and if a PMIP service is provided to the peer mobile node, updating the local forwarding entries to instruct forwarding the data packet transmitted by the mobile node to the peer mobile node in a PMIP manner.

Wherein, the mobile access gateway further comprises a location updating unit, configured to: when the mobile access gateway is a target mobile access gateway to which the mobile node is handed over, perform location update for the mobile node to the eLMA, and carry indication information of whether the mobile access gateway can provide an ePMIP service to the mobile node.

Wherein, the data forwarding unit is further configured to: when the mobile node is handed over from the mobile access gateway to a target mobile access gateway which is a non-enhanced mobile access gateway in the process of communication between the mobile node and a peer mobile node in an ePMIP manner:

after the data forwarding unit receives a data packet transmitted by the peer mobile node to the mobile node which is forwarded by the peer mobile access gateway, transmit the data packet to the eLMA which transmits the data packet to the target mobile access gateway.

Figure 10:
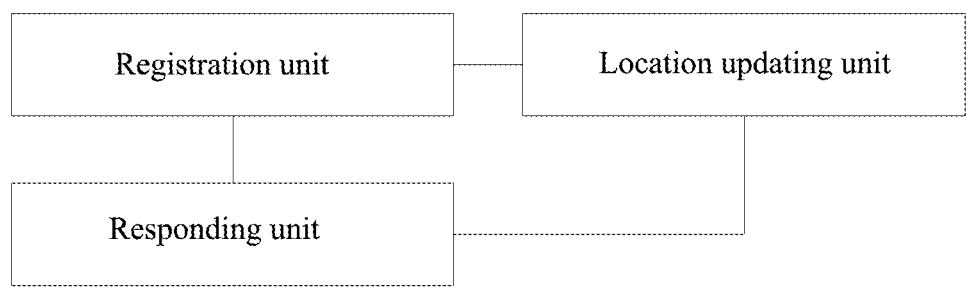
FIG. 10 is a block diagram of an eLMA according to an embodiment of the present invention.

The embodiments of the present invention further provide an enhanced Local Mobility Anchor (eLMA), as shown in FIG. 10, comprising a registration unit, configured to: after receiving a registration request from a mobile access gateway for a mobile node, determine whether to provide an ePMIP service to the mobile node, and establish location information for the mobile node including flag information of whether a mobile access gateway to which the mobile node is attached provides an ePMIP service to the mobile node.

Wherein, the eLMA further comprises a responding unit, configured to: after receiving a location query request from the mobile access gateway, return a location query response which carries flag information of whether a mobile access gateway of a peer mobile node queried by the mobile access gateway provides an ePMIP service to the peer mobile node.

Wherein, the registration unit is further configured to: after establishing the location information for the mobile node, transmit the negotiation information of whether the mobile access gateway to which the mobile node is attached provides an ePMIP service to the mobile node to the mobile access gateway.

Wherein, the eLMA further comprises a location updating unit, configured to: in the process of communication between the mobile node and a peer mobile node, after the mobile node is handed over from the mobile access gateway to a target mobile access gateway and a location update is received from the target mobile access gateway, determine flag information of whether the target mobile access gateway provides an ePMIP service to the mobile node, update the location information of the mobile node, and transmit, through the mobile access gateway or directly, the location information of the mobile node to a peer mobile access gateway to which the peer mobile node is currently attached, which includes the flag information of whether the target mobile access gateway provides an ePMIP service to the mobile node.

Wherein, the location updating unit directly transmitting the location information of the mobile node to the peer mobile access gateway comprises:

transmitting a location update message carrying the location information of the mobile node to all mobile access gateways in its management domain.

Wherein, the location updating unit directly transmitting the location information of the mobile node to the peer mobile access gateway comprises:

after the location updating unit receives the data packet transmitted by the peer mobile node to the mobile node which is forwarded by the mobile access gateway, searching for locally stored location information according to a source address of the data packet, and if a care-of address stored in the location information is different from a source address in an outer tunnel head of the data packet, transmitting a location update message carrying the location information of the mobile node to the peer mobile access gateway.

The above mobile access gateway may be an enhanced mobile access gateway or an ordinary mobile access gateway.

The embodiments of the present invention further provide a system including the above mobile access gateway and eLMA.

A person having ordinary skill in the art can understand that all or a part of steps in the above method can be implemented by programs instructing related hardware, and the programs can be stored in a computer readable storage medium, such as a read-only memory, disk or disc etc. Alternatively, all or a part of steps in the above embodiments can also be implemented by one or more integrated circuits. Accordingly, each module/unit in the above embodiments can be implemented in a form of hardware, or can also be implemented in a form of software functional module. The present document is not limited to any particular form of a combination of hardware and software.

INDUSTRIAL APPLICABILITY

The embodiments of the present invention achieve intercommunication between a mobile node in an ePMIP area and a mobile node in a PMIP area, and smooth handover of a mobile node between the two areas, thereby meeting requirements on intercommunication and mobility between MNs after deployment in an incremental manner.

What is claimed is:

1. An intercommunication method for mobile nodes, comprising:
after an enhanced mobile access gateway receives a data packet transmitted by a mobile node to a peer node for the first time, if the enhanced mobile access gateway provides an enhanced Proxy Mobile IP (ePMIP) service to the mobile node, the enhanced mobile access gateway judging whether a peer mobile access gateway to which the peer mobile node is currently attached provides the ePMIP service to the peer mobile node, and if yes, forwarding the data packet in the ePMIP manner, and creating a local forwarding entry to instruct a subsequent packet to be forwarded in the ePMIP manner, and if not, forwarding the data packet in a Proxy Mobile IP (PMIP) manner, and creating a local forwarding entry to instruct a subsequent packet to be forwarded in the PMIP manner;
wherein the enhanced mobile access gateway judging whether the peer mobile access gateway provides the ePMIP service to the peer mobile node comprises:
transmitting, by the enhanced mobile access gateway, a location query request to an enhanced Local Mobility Anchor (eLMA), and
making, by the enhanced mobile access gateway, a judgment according to an E flag carried in a location query response returned by the eLMA, wherein the E flag indicates whether a conventional Proxy Mobile IP (PMIP) service or the ePMIP service is provided to the peer mobile node, the E flag is set to 1 when the ePMIP service is provide to the peer mobile node, and the E flag is set to 0 when the conventional PMIP service is provided to the peer mobile node.

2. The method according to claim 1, further comprising:
after the eLMA receives a registration request from a mobile access gateway for registering a mobile node which is attached to the mobile access gateway, the registration request carrying an indication of whether the mobile access gateway is able to provide the ePMIP service to a currently registered mobile node, determining whether to provide the ePMIP service to the currently registered mobile node, and establishing location information of the currently registered mobile node, the location information including flag information of whether the mobile access gateway provides the ePMIP service to the currently registered mobile node.

3. The method according to claim 2, further comprising:
after the eLMA establishes the location information for the currently registered mobile node, transmitting negotiation information of whether the mobile access gateway provides the ePMIP service to the currently registered mobile node to the mobile access gateway.

4. A handover method for a mobile node, comprising:
in a process of communication between a mobile node and a peer mobile node, after the mobile node is handed over from a source mobile access gateway to a target mobile access gateway, the target mobile access gateway performing location update for the mobile node to an enhanced Local Mobility Anchor (eLMA);

the eLMA transmitting through the source mobile access gateway or transmitting directly the location information of the mobile node to a peer mobile access gateway to which the peer mobile node is currently attached; and the peer mobile access gateway updating a local forwarding entry of the mobile node according to the location information, wherein if the target mobile access gateway provides an enhanced Proxy Mobile IP (ePMIP) service to the mobile node, updating the local forwarding entry to indicate forwarding a data packet transmitted by the peer mobile node to the mobile node in the ePMIP manner, and if the target mobile access gateway provides a Proxy Mobile IP (PMIP) service to the mobile node, updating the local forwarding entry to indicate forwarding the data packet in the PMIP manner; wherein the method further comprises:

when the target mobile access gateway performs location update for the mobile node to the eLMA, carrying indication information of whether the target mobile access gateway is able to provide the ePMIP service to the mobile node; and after the eLMA receives the location update, determining whether the target mobile access gateway provides the ePMIP service to the mobile node, and updating location information of the mobile node, the location information including an E flag, wherein the E flag indicates whether a conventional PMIP service or the ePMIP service is provided to the mobile node, the E flag is set to 1 when the ePMIP service is provide to the mobile node, and the E flag is set to 0 when the conventional PMIP service is provided to the mobile node.

5. The method according to claim 4, further comprising:

when the peer mobile access gateway provides the ePMIP service to the peer mobile node, the source mobile access gateway provides the ePMIP service to the mobile node, and the target mobile access gateway is a non-enhanced mobile access gateway, after the source mobile access gateway receives a data packet transmitted by the peer mobile node to the mobile node and forwarded by the peer mobile access gateway, transmitting the data packet to the eLMA; and the eLMA transmitting the data packet to the target mobile access gateway, and the target mobile access gateway transmitting the data packet to the mobile node.

6. The method according to claim 4, wherein, the eLMA transmitting directly the location information of the mobile node to the peer mobile access gateway comprises:

the eLMA transmitting a location update message carrying the location information of the mobile node to all mobile access gateways in its management domain; or, the eLMA transmitting directly the location information of the mobile node to the peer mobile access gateway comprises:

after the eLMA receives the data packet transmitted by the peer mobile node to the mobile node and forwarded by the source mobile access gateway, searching for locally stored location information according to a source address of the data packet, and if a care-of address stored in the location information is different from a source address in an outer tunnel head of the data packet, the eLMA transmitting a location update message carrying the location information of the mobile node to the peer mobile access gateway.

7. A mobile access gateway, comprising hardware performing instructions stored in a non-transitory computer readable medium which executes steps in a data forwarding unit, wherein the data forwarding unit is configured to: after receiving a data packet transmitted by a mobile node to a peer mobile node for the first time, if the mobile access gateway provides an enhanced Proxy Mobile IP (ePMIP) service to the mobile node, judge whether a peer mobile access gateway to which the peer mobile node is currently attached provides the ePMIP service to the peer mobile node, and if yes, forward the data packet in the ePMIP manner, and create a local forwarding entry to instruct a subsequent packet to be forwarded in the ePMIP manner, and if not, forward the data packet in a Proxy Mobile IP (PMIP) manner, and create a local forwarding entry to instruct a subsequent packet to be forwarded in the PMIP manner;

wherein the data forwarding unit is further configured to judge whether the peer mobile access gateway provides the ePMIP service to the peer mobile node in the following way:

transmitting a location query request to an enhanced Local Mobility Anchor (eLMA), and making the judgment according to an E flag carried in a location query response returned by the eLMA, wherein the E flag indicates whether a conventional Proxy Mobile IP (PMIP) service or the ePMIP service is provided to the peer mobile node, the E flag is set to 1 when the ePMIP service is provide to the peer mobile node, and the E flag is set to 0 when the conventional PMIP service is provided to the peer mobile node.

8. The mobile access gateway according to claim 7, wherein the instructions further causes the hardware to execute steps in a registration unit, and the registration unit is configured to:

transmit a registration request to the eLMA for the mobile node, which carries an indication of whether the mobile access gateway is able to provide the ePMIP service to the mobile node, and receive and store negotiation information of whether the ePMIP service is provided to the mobile node which is returned by the eLMA.

9. The mobile access gateway according to claim 7, further comprising a location updating unit, configured to: when the mobile access gateway is a target mobile access gateway to which the mobile node has been handed over, perform location update for the mobile node to the eLMA, and carry indication information of whether the mobile access gateway is able to provide the ePMIP service to the mobile node.

10. The mobile access gateway according to claim 7, wherein, the data forwarding unit is further configured to: when the mobile node is handed over from the mobile access gateway to a target mobile access gateway which is a non-enhanced mobile access gateway in the process of communication between the mobile node and the peer mobile node in the ePMIP manner:

after receiving a data packet transmitted by the peer mobile node to the mobile node, transmit the data packet to the eLMA which transmits the data packet to the target mobile access gateway.

11. An enhanced Local Mobility Anchor (eLMA), comprising hardware performing instructions stored in a non-transitory computer readable medium which executes steps in a registration unit, wherein the registration unit is configured to: after receiving a registration request from a mobile access gateway for a mobile node, determine whether to provide an enhanced Proxy Mobile IP (ePMIP) service to the mobile node, and establish location information of the mobile node, the location information including an E flag, wherein the E flag indicates whether a conventional PMIP service or the ePMIP service is provided to the mobile node, the E flag is set to 1 when the ePMIP service is provide to the mobile node, and the E flag is set to 0 when the conventional PMIP service is provided to the mobile node.

12. The eLMA according to claim 11, wherein the instructions further causes the hardware to executes steps in a responding unit, and the responding unit is configured to:
after receiving a location query request from the mobile access gateway, return a location query response, the location query response carrying flag information of whether a mobile access gateway of a peer mobile node provides the ePMIP service to the peer mobile node which is queried by the mobile access gateway.

13. The eLMA according to claim 11, wherein, the registration unit is further configured to: after establishing the location information for the mobile node, transmit negotiation information of whether the mobile access gateway to which the mobile node is attached provides the ePMIP service to the mobile node to the mobile access gateway.

14. The eLMA according to claim 11, wherein the instructions further causes the hardware to executes steps in a location updating unit, and the a location updating unit is configured to: in the process of communication between the mobile node and a peer mobile node, after the mobile node is handed over from the mobile access gateway to a target mobile access gateway and a location update is received from the target mobile access gateway, determine flag information of whether the target mobile access gateway provides the ePMIP service to the mobile node, update the location information of the mobile node, and transmit through the mobile access gateway or transmit directly the location information of the mobile node to a peer mobile access gateway to which the peer mobile node is currently attached, the location information including the flag information of whether the target mobile access gateway provides the ePMIP service to the mobile node.

15. The eLMA according to claim 14, wherein,
the location updating unit is configured to directly transmit the location information of the mobile node to the peer mobile access gateway in the following way:
transmitting a location update message carrying the location information of the mobile node to all mobile access gateways in its management domain;
or,
the location updating unit is configured to directly transmit the location information of the mobile node to the peer mobile access gateway in the following way:
after receiving a data packet transmitted by the peer mobile node to the mobile node and forwarded by the mobile access gateway, searching for locally stored location information according to a source address of the data packet, and if a care-of address stored in the location information is different from a source address in an outer tunnel head of the data packet, transmitting a location update message carrying the location information of the mobile node to the peer mobile access gateway.

16. A registration method for a mobile node, comprising:
when an enhanced Mobile Access Gateway (eMAG) or a Mobile Access Gateway (MAG) registers to an enhanced Local Mobility Anchor (eLMA) for a mobile node, carrying an indication of whether the eMAG or MAG to which the mobile node is currently attached is able to provide an enhanced Proxy Mobile IP (ePMIP) service to the mobile node; and
after the eLMA receives a registration request from the eMAG or MAG, establishing location information for the mobile node, the location information including an E flag, wherein the E flag indicates whether a conventional PMIP service or the ePMIP service is provided to the mobile node, the E flag is set to 1 when the ePMIP service is provide to the mobile node, and the E flag is set to 0 when the conventional PMIP service is provided to the mobile node.

17. The method according to claim 16, further comprising: after the eLMA establishes the location information for the mobile node, transmitting negotiation information of whether the ePMIP service is provided to the mobile node to the eMAG or MAG.

* * * * *